US010270992B1

United States Patent
Yeh et al.

(10) Patent No.: US 10,270,992 B1
(45) Date of Patent: Apr. 23, 2019

(54) SAMPLING DEVICE AND METHOD FOR REDUCING NOISE

(71) Applicant: TAIWAN SEMICONDUCTOR MANUFACTURING CO., LTD., Hsinchu (TW)

(72) Inventors: Shang-Fu Yeh, Hsinchu (TW); Chih-Lin Lee, Miaoli County (TW); Chin Yin, Tainan (TW); Kuo-Yu Chou, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 15/828,292

(22) Filed: Nov. 30, 2017

(51) Int. Cl.
*H04N 5/357* (2011.01)
*H04N 5/378* (2011.01)
*H04N 5/3745* (2011.01)

(52) U.S. Cl.
CPC ......... *H04N 5/3575* (2013.01); *H04N 5/3577* (2013.01); *H04N 5/37457* (2013.01); *H04N 5/378* (2013.01)

(58) Field of Classification Search
CPC ............... H04N 5/3575; H04N 5/3577; H04N 5/37457; H04N 5/378; H04N 5/357; H04N 5/37
See application file for complete search history.

(56) References Cited

U.S. PATENT DOCUMENTS

| | | | | |
|---|---|---|---|---|
| 6,853,241 B2* | 2/2005 | Fujimoto | ................ | H03F 3/005 327/124 |
| 7,133,074 B1* | 11/2006 | Brehmer | ................ | H04N 5/335 348/308 |
| 8,587,569 B2* | 11/2013 | Ono | ................ | G09G 3/3233 315/169.3 |
| 8,773,580 B2* | 7/2014 | Ebihara | ................ | H04N 5/3741 348/241 |
| 8,791,888 B2* | 7/2014 | Uchino | ................ | G09G 3/3233 345/78 |
| 2003/0035499 A1* | 2/2003 | Staszewski | ............ | H03D 7/125 375/346 |
| 2004/0119853 A1* | 6/2004 | Kokubun | ............. | H04N 5/3598 348/241 |
| 2005/0103977 A1* | 5/2005 | Krymski | .............. | H04N 3/1562 250/208.1 |
| 2005/0206752 A1* | 9/2005 | Lim | ................ | H04N 5/3575 348/241 |

(Continued)

OTHER PUBLICATIONS

Xinyang Wang et. al., "A CMOS Image Sensor with Buried-Channel Source Follower", IEEE ISSCC 2008.

(Continued)

*Primary Examiner* — Chia Wei A Chen
(74) *Attorney, Agent, or Firm* — Maschoff Brennan

(57) ABSTRACT

A device includes a current source and sampling units. Each of the sampling units includes a transistor and a capacitor electrically coupled to a gate of the transistor. The sampling units are sequentially activated such that the capacitor samples a voltage of a column line of a pixel array and are activated together such that the transistor is turned on according to the sampled voltage of the capacitor, to drain a current from the current source through an output node to generate an output voltage thereat.

17 Claims, 5 Drawing Sheets

(56) References Cited

U.S. PATENT DOCUMENTS

| | | | |
|---|---|---|---|
| 2008/0062286 A1* | 3/2008 | Beck | H04N 5/357 348/241 |
| 2008/0259193 A1* | 10/2008 | Toya | H04N 5/217 348/300 |
| 2011/0181626 A1* | 7/2011 | Toyomura | G09G 3/3233 345/690 |
| 2012/0001056 A1* | 1/2012 | Fife | G01N 27/4145 250/208.1 |
| 2013/0143221 A1* | 6/2013 | Beauchemin | G01N 27/416 435/6.12 |
| 2014/0131554 A1* | 5/2014 | Ishii | H01L 27/14665 250/208.1 |
| 2014/0263966 A1* | 9/2014 | Hikosaka | H04N 5/3745 250/208.1 |
| 2014/0354865 A1* | 12/2014 | Yun | H04N 5/37455 348/308 |
| 2014/0375855 A1* | 12/2014 | Nishihara | H01L 27/14603 348/301 |
| 2015/0021460 A1* | 1/2015 | Matsuda | H04N 9/045 250/208.1 |
| 2015/0208008 A1* | 7/2015 | Gendai | H04N 5/3698 250/208.1 |
| 2016/0006968 A1* | 1/2016 | Sakai | H04N 5/378 348/302 |
| 2016/0028974 A1* | 1/2016 | Guidash | H04N 5/37455 348/294 |
| 2017/0127002 A1* | 5/2017 | Eshel | H04N 5/3575 |
| 2017/0201702 A1* | 7/2017 | Niwa | H01L 27/14612 |
| 2017/0311787 A1* | 11/2017 | Tanaka | A61B 1/051 |
| 2017/0324916 A1* | 11/2017 | Sugawa | H01L 29/78 |
| 2017/0353683 A1* | 12/2017 | Sakakibara | H04N 5/363 |
| 2018/0103221 A1* | 4/2018 | Dai | H04N 5/3655 |
| 2018/0198997 A1* | 7/2018 | Otaka | H04N 5/365 |
| 2018/0234652 A1* | 8/2018 | Sugawa | H04N 5/378 |

OTHER PUBLICATIONS

Philippe Martin-Gonthier et. al., "Novel Readout Circuit Architecture for CMOS Image Sensors Minimizing RTS Noise", IEEE Electron Device Letters, vol. 32, No. 6, Jun. 2011.

* cited by examiner

SAMPLING DEVICE AND METHOD FOR REDUCING NOISE

BACKGROUND

A complementary metal oxide semiconductor (CMOS) image sensor requires a low noise readout circuit in order to obtain a better image quality. However, due to the gradually shrinking device dimension, a buffer for sampling the voltage from the pixel suffers from random telegraph signal (RTS) noise.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
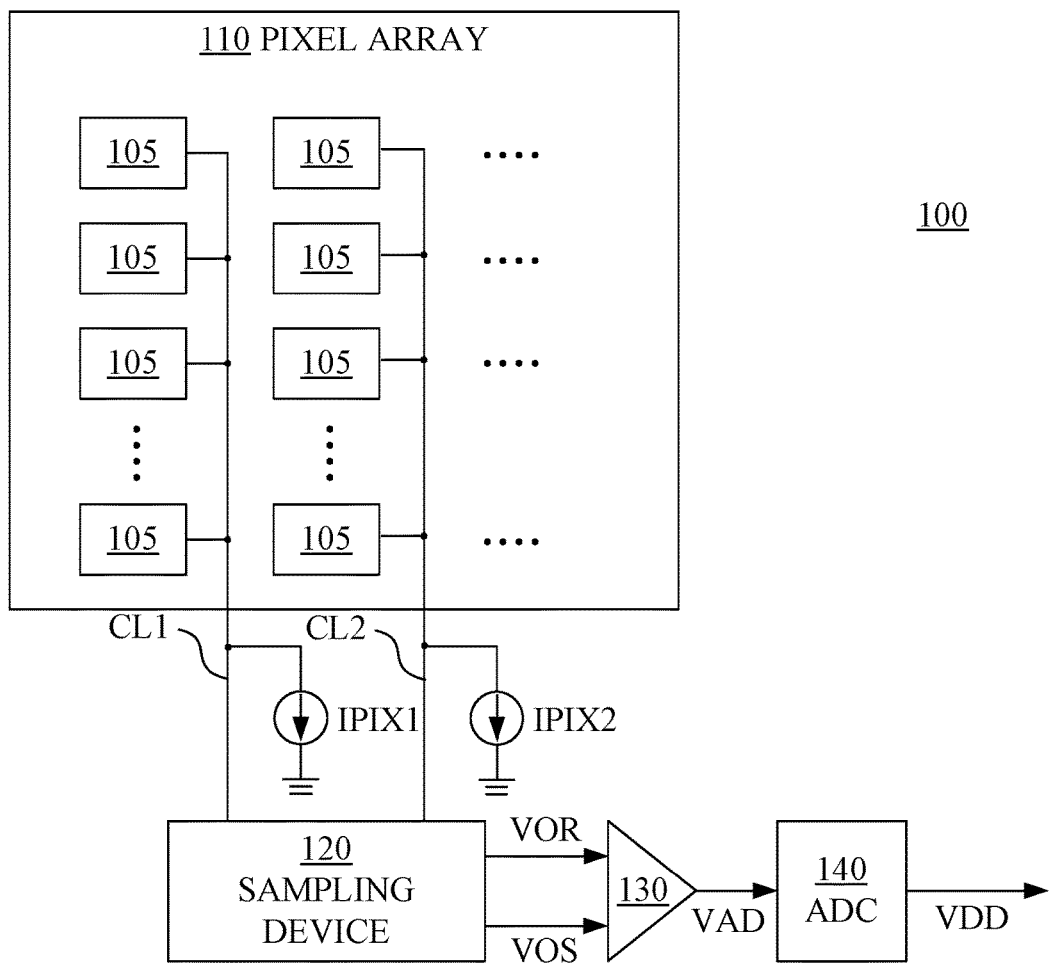
FIG. 1 is an exemplary diagram of an image sensing device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

FIG. 1 is an exemplary diagram of an image sensing device 100 in accordance with various embodiments of the present disclosure.

The image sensing device 100 includes a pixel array 110, a sampling device 120, a gain amplifier 130 and an analog-to-digital converter (ADC) 140.

For illustration, the pixel array 110 includes a plurality of pixel cells 105. In some embodiments, the pixel array 110 is an image sensor array, in which each of the pixel cells 105 is an image sensing unit configured to convert variable attenuation of light waves as the light waves pass through or reflect off objects into signals conveying the information that constitutes an image.

In some embodiments, the pixel cells 105 forms a plurality of columns, in which in FIG. 1, for simplicity of illustration, only two columns of pixel cells 105 and two column line CL1 and CL2 are exemplarily illustrated. One column of the pixel cells 105 is electrically coupled to the column line CL1, and the other column of the pixel cells 105 is electrically coupled to the column line CL2.

In some embodiments, the column line CL1 is electrically coupled to a current sink IPIX1 configured to drive the pixel cells 105 corresponding to the column line CL1. The column line CL2 is electrically coupled to a current sink IPIX2 configured to drive the pixel cells 105 corresponding to the column line CL2.

The sampling device 120 is configured to sample the voltage at the column lines CL1 and CL2. Take the column line CL1 as an example, in accordance to the time period that the sampling device 120 performs the sampling, the voltage sampled by the sampling device 120 is either a charge transfer voltage VOS or a pixel reset voltage VOR of the pixels of the corresponding column line.

More specifically, in the pixel cells 105 of the pixel array 110, charge frequently need to be transferred between different nodes. For example, in a complementary metal oxide semiconductor (CMOS) image sensor, charge accumulated in a photodiode from incident photons may need to be transferred from the photodiode to a storage node (not illustrated) in the pixel cell 105, and then, subsequently, to a floating diffusion node (not illustrated) for read out. Moreover, in order to sense new image data, a reset procedure is required to remove the charge in the storage node in the pixel cell 105.

As a result, for the column line CL1, when the voltage is sampled under the condition that the charge is transferred to the pixel cells 105, the sampled voltage is the charge transfer voltage. When the voltage is sampled under the condition that the pixel is reset, the sampled voltage is the pixel reset voltage.

In some embodiments, the gain amplifier 130 and the analog-to-digital converter (ADC) 140 are implemented as differential pair circuits. More specifically, the differential pair circuits configured to process the difference between two input signals. As a result, after the sampling device 120 samples the charge transfer voltage VOS and the pixel reset voltage VOR of the column line CL1, the difference between the charge transfer voltage VOS and the pixel reset voltage VOR is amplified by the gain amplifier 130. Further, the amplified difference VAD is further converted from an analog form to a digital form by the analog-to-digital converter (ADC) 140 to output a digitalized difference, which is a signal swing value VSS.

In some embodiments, if the gain amplifier 130 and the analog-to-digital converter (ADC) 140 are not implemented as differential pair circuits, such that the charge transfer voltage VOS and the pixel reset voltage VOR are processed separately, a difference calculator (not illustrated) is required to subtract the charge transfer voltage VOS and the pixel reset voltage VOR after being amplified and converted.

In some embodiments, noises are generated due to the capacitive effect of the nodes in the pixel cells 105 and the fixed pattern noise generated due to the mismatch between the pixel cells 105. Such noises exist in both the charge transfer voltage VOS and the pixel reset voltage VOR. By differentially processing the charge transfer voltage VOS and the pixel reset voltage VOR to generate the difference therebetween, i.e., the signal swing value VSS, such noises are able to be removed. In some embodiments, the technique to sample the charge transfer voltage VOS and the pixel reset voltage VOR and to perform subtraction between the two readout voltages is also referred to as correlated double sampling (CDS).

Figure 2:
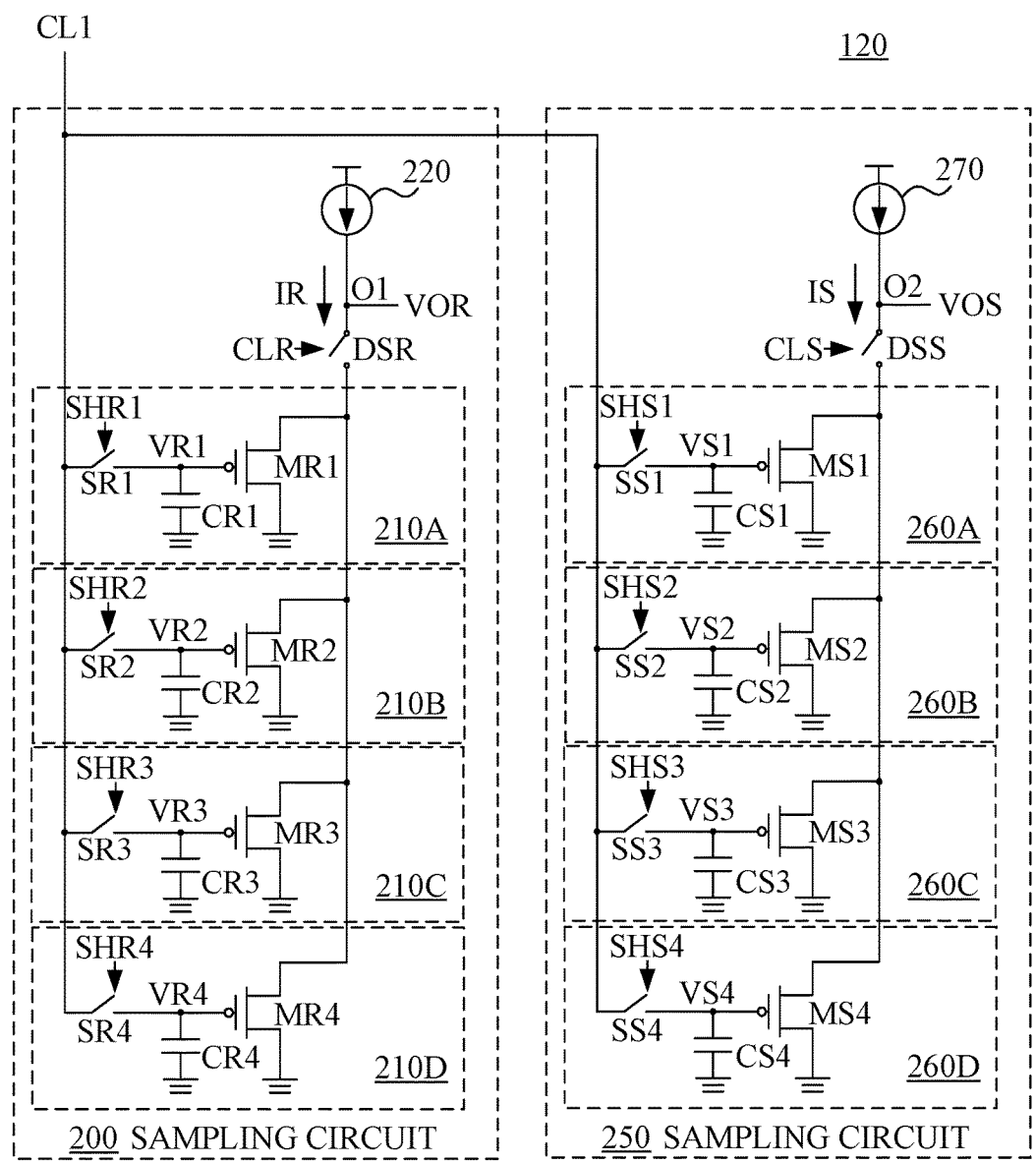
FIG. 2 is an exemplary diagram of the sampling device in FIG. 1, in accordance with various embodiments of the present disclosure.

FIG. 2 is an exemplary diagram of the sampling device 120 in FIG. 1, in accordance with various embodiments of the present disclosure. The operation of sampling the voltage of the column line CL1 is described in detail in accompany with FIG. 2.

As illustratively shown in FIG. 2, the sampling device 120 includes a sampling circuit 200 and a sampling circuit 250 that are configured to sample the voltage of the column lien CL1.

In some embodiments, the sampling circuit 200 is used to sample the voltage of the column line CL1 and generate the pixel reset voltage VOR. The sampling circuit 250 is used to sample the voltage of the column line CL1 and generate the charge transfer voltage VOS.

For illustration, the sampling circuit 200 includes four sampling units 210A, 210B, 210C and 210D, a draining switch DSR and a current source 220. Various numbers of the sampling units in the sampling circuit 200 are within the contemplated scope of the present disclosure.

Each of the sampling units 210A, 210B, 210C and 210D is configured to sample the voltage of the column line CL1. The configuration and the operation of each of sampling units 210A, 210B, 210C and 210D are described in detail in the following paragraphs.

The sampling unit 210A includes a sampling switch SR1, a capacitor CR1 and a transistor MR1. The sampling switch SR1 is disposed between the column line CL1 and the capacitor CR1 and is under the control of a sampling control signal SHR1.

The sampling control signal SHR1 activates the sampling unit 210A to sample the voltage of the column line CL1. More specifically, when the sampling control signal SHR1 is in a first state, e.g. the low state, the sampling switch SR1 is controlled to be open-circuited.

Subsequently, when the sampling control signal SHR1 turns to a second state opposite to the first state, e.g. the high state, the sampling switch SR1 is controlled to be short-circuited to electrically couple the column line CL1 and the capacitor CR1. As a result, the capacitor CR1 is activated to receive the current from the column line CL1 and is charged in order to sample the voltage thereat.

The sampling unit 210B includes a sampling switch SR2, a capacitor CR2 and a transistor MR2. The sampling switch SR2 is disposed between the column line CL1 and the capacitor CR2 and is under the control of a sampling control signal SHR2.

The sampling control signal SHR2 activates the sampling unit 210B to sample the voltage of the column line CL1. More specifically, when the sampling control signal SHR2 is in a first state, e.g. the low state, the sampling switch SR2 is controlled to be open-circuited.

Subsequently, when the sampling control signal SHR2 turns to a second state opposite to the first state, e.g. the high state, the sampling switch SR2 is controlled to be short-circuited to electrically couple the column line CL1 and the capacitor CR2. As a result, the capacitor CR2 is activated to receive the current from the column line CL1 and is charged in order to sample the voltage thereat.

The sampling unit 210C includes a sampling switch SR3, a capacitor CR3 and a transistor MR3. The sampling switch SR3 is disposed between the column line CL1 and the capacitor CR3 and is under the control of a sampling control signal SHR3.

The sampling control signal SHR3 activates the sampling unit 210C to sample the voltage of the column line CL1. More specifically, when the sampling control signal SHR3 is in a first state, e.g. the low state, the sampling switch SR3 is controlled to be open-circuited.

Subsequently, when the sampling control signal SHR3 turns to a second state opposite to the first state, e.g. the high state, the sampling switch SR3 is controlled to be short-circuited to electrically couple the column line CL1 and the capacitor CR3. As a result, the capacitor CR3 is activated to receive the current from the column line CL1 and is charged in order to sample the voltage thereat.

The sampling unit 210D includes a sampling switch SR4, a capacitor CR4 and a transistor MR4. The sampling switch SR4 is disposed between the column line CL1 and the capacitor CR4 and is under the control of a sampling control signal SHR4.

The sampling control signal SHR4 activates the sampling unit 210D to sample the voltage of the column line CL1. More specifically, when the sampling control signal SHR2 is in a first state, e.g. the low state, the sampling switch SR4 is controlled to be open-circuited.

Subsequently, when the sampling control signal SHR4 turns to a second state opposite to the first state, e.g. the high state, the sampling switch SR4 is controlled to be short-circuited to electrically couple the column line CL1 and the capacitor CR4. As a result, the capacitor CR4 is activated to receive the current from the column line CL1 and is charged in order to sample the voltage thereat.

In some embodiments, the sampling units 210A, 210B, 210C and 210D are sequentially activated to sample the voltage of the column line CL1.

Figure 3:
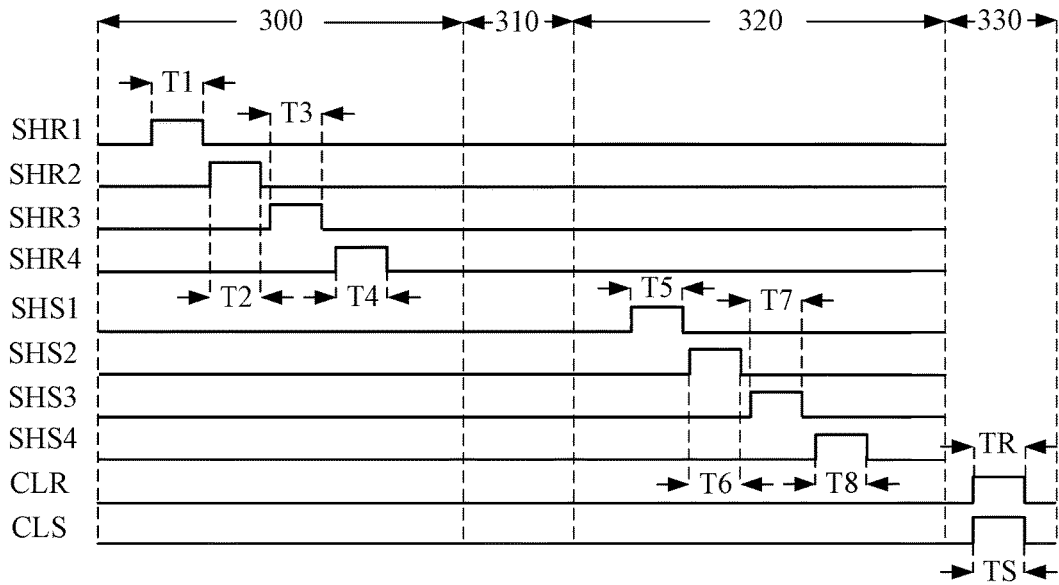
FIG. 3 is an exemplary diagram of waveforms of the sampling control signals in FIG. 2, in accordance with various embodiments of the present disclosure.

FIG. 3 is an exemplary diagram of waveforms of the sampling control signals in FIG. 2, in accordance with various embodiments of the present disclosure.

For illustration, the X-axis of each of the waveforms represents time. The Y-axis of each of the waveforms represents the state of the sampling control signals.

As illustrated in FIG. 2 and FIG. 3, during a pixel reset sampling period 300, the sampling control signals SHR1, SHR2, SHR3 and SHR4 are at the high state during the sampling time intervals T1, T2, T3 and T4, respectively, to sequentially activate the capacitors CR1, CR2, CR3 and CR4 in FIG. 2 to sample the voltage of the column line CL1. Each two of the sampling time intervals T1, T2, T3 and T4 of the sampling control signals SHR1, SHR2, SHR3 and SHR4 is non-overlapped.

In some embodiments, the capacitor CR1 of the sampling unit 210A is activated by the sampling control signal SHR1 first to sample the voltage of the column line CL1. Subsequently, the capacitor CR2 of the sampling unit 210B is activated by the sampling control signal SHR2 to sample the voltage of the column line CL1. Thirdly, the capacitor CR3 of the sampling unit 210C is activated by the sampling control signal SHR3 to sample the voltage of the column line CL1. Fourthly, the capacitor CR4 of the sampling unit 210D is activated by the sampling control signal SHR4 to sample the voltage of the column line CL1.

Correspondingly, the sampling circuit 250 includes four sampling units 260A, 260B, 260C and 260D, a draining switch DSS and a current source 270. Various numbers of the sampling units in the sampling circuit 250 are within the contemplated scope of the present disclosure.

Each of the sampling units 260A, 260B, 260C and 260D is configured to sample the voltage of the column line CL1. The configuration and the operation of each of sampling units 260A, 260B, 260C and 260D are described in detail in the following paragraphs.

The sampling unit 260A includes a sampling switch SS1, a capacitor C S1 and a transistor MS1. The sampling switch SS1 is disposed between the column line CL1 and the capacitor C S1 and is under the control of a sampling control signal SHS1.

The sampling control signal SHS1 activates the sampling unit 260A to sample the voltage of the column line CL1. More specifically, when the sampling control signal SHS1 is in a first state, e.g. the low state, the sampling switch SS1 is controlled to be open-circuited.

Subsequently, when the sampling control signal SHS1 turns to a second state opposite to the first state, e.g. the high state, the sampling switch SS1 is controlled to be short-circuited to electrically couple the column line CL1 and the capacitor CS1. As a result, the capacitor CS1 is activated to receive the current from the column line CL1 and is charged in order to sample the voltage thereat.

The sampling unit 260B includes a sampling switch SS2, a capacitor CS2 and a transistor MS2. The sampling switch SS2 is disposed between the column line CL1 and the capacitor CS2 and is under the control of a sampling control signal SHS2.

The sampling control signal SHS2 activates the sampling unit 260B to sample the voltage of the column line CL1. More specifically, when the sampling control signal SHS2 is in a first state, e.g. the low state, the sampling switch SS2 is controlled to be open-circuited.

Subsequently, when the sampling control signal SHS2 turns to a second state opposite to the first state, e.g. the high state, the sampling switch SS2 is controlled to be short-circuited to electrically couple the column line CL1 and the capacitor CS2. As a result, the capacitor CS2 is activated to receive the current from the column line CL1 and is charged in order to sample the voltage thereat.

The sampling unit 260C includes a sampling switch SS3, a capacitor CS3 and a transistor MS3. The sampling switch SS3 is disposed between the column line CL1 and the capacitor CS3 and is under the control of a sampling control signal SHS3.

The sampling control signal SHS3 activates the sampling unit 260C to sample the voltage of the column line CL1. More specifically, when the sampling control signal SHS3 is in a first state, e.g. the low state, the sampling switch SS3 is controlled to be open-circuited.

Subsequently, when the sampling control signal SHS3 turns to a second state opposite to the first state, e.g. the high state, the sampling switch SS3 is controlled to be short-circuited to electrically couple the column line CL1 and the capacitor CS3. As a result, the capacitor CS3 is activated to receive the current from the column line CL1 and is charged in order to sample the voltage thereat.

The sampling unit 260D includes a sampling switch SS4, a capacitor CS4 and a transistor MS4. The sampling switch SS4 is disposed between the column line CL1 and the capacitor CS4 and is under the control of a sampling control signal SHS4.

The sampling control signal SHS4 activates the sampling unit 260D to sample the voltage of the column line CL1. More specifically, when the sampling control signal SHS4 is in a first state, e.g. the low state, the sampling switch SS4 is controlled to be open-circuited.

Subsequently, when the sampling control signal SHS4 turns to a second state opposite to the first state, e.g. the high state, the sampling switch SS4 is controlled to be short-circuited to electrically couple the column line CL1 and the capacitor CS4. As a result, the capacitor CS4 is activated to receive the current from the column line CL1 and is charged in order to sample the voltage thereat.

As illustrated in FIG. 3, a charge transfer period 310 is behind the pixel reset sampling period 300 for performing charge transfer on the pixel cells 105 illustrated in FIG. 1.

In a charger transfer sampling period 320 after the charge transfer period 310, the sampling control signals SHS1, SHS2, SHS3 and SHS4 are at the high state during the sampling time intervals T5, T6, T7 and T8, respectively, to sequentially activate the capacitors CS1, CS2, CS3 and CS4 in FIG. 2 to sample the voltage of the column line CL1. Each two of the sampling time intervals T5, T6, T7 and T8 of the sampling control signals SHS1, SHS2, SHS3 and SHS4 is non-overlapped.

In some embodiments, the capacitor CS1 of the sampling unit 260A is activated by the sampling control signal SHS1 first to sample the voltage of the column line CL1. Subsequently, the capacitor CS2 of the sampling unit 260B is activated by the sampling control signal SHS2 to sample the voltage of the column line CL1. Thirdly, the capacitor CS3 of the sampling unit 260C is activated by the sampling control signal SHS3 to sample the voltage of the column line CL1. Fourthly, the capacitor CS4 of the sampling unit 260D is activated by the sampling control signal SHS4 to sample the voltage of the column line CL1.

As illustrated in FIG. 3, a sampling result generating period 330 is behind the charger transfer sampling period 320 for generating output voltages of the sampling result of the pixel cells 105 illustrated in FIG. 1.

After the voltage is sampled by the capacitors CR1, CR2, CR3 and CR4, the draining switch DSR is switched on by a draining control signal CLR which is at the high state during the sampling time interval TR, to activate the sampling units 210A, 210B, 210C and 210D to drain a current IR together from the current source 220.

In some embodiments, the draining switch DSR is disposed between the current source 220 and each of the transistors MR1, MR2, MR3 and MR4 and is under the control of the draining control signal CLR.

The draining control signal CLR controls the draining switch DSR to activate the sampling units 210A, 210B, 210C and 210D to drain the current IR together from the current source 220. More specifically, when the draining control signal CLR is in a first state, e.g. the low state, the draining switch DSR is controlled to be open-circuited.

Subsequently, when the draining control signal CLR turns to a second state opposite to the first state, e.g. the high state, the draining switch DSR is controlled to be short-circuited to electrically couple the current source 220 and each of the transistors MR1, MR2, MR3 and MR4.

As illustrated in FIG. 2, the transistors MR1, MR2, MR3 and MR4 are PMOS transistors in some embodiments. The transistors MR1, MR2, MR3 and MR4 are turned on according to the sampled voltage VR1, VR2, VR3 and VR4 of the capacitors CR1, CR2, CR3 and CR4 respectively. The transistors MR1, MR2, MR3 and MR4 drain the current IR together from the current source 220.

In some embodiments, the transistors MR1, MR2, MR3 and MR4 drain the current IR through an output node O1 to generate the output voltage VOR thereat.

On the other hand, after the voltage is sampled by the capacitors CS1, CS2, CS3 and CS4, the draining switch DSS is switched on by a draining control signal CLS which is at the high state during the sampling time interval TS, to activate the sampling units 260A, 260B, 260C and 260D to drain a current IS together from the current source 270.

In some embodiments, the draining switch DSS is disposed between the current source 270 and each of the transistors MS1, MS2, MS3 and MS4 and is under the control of a draining control signal CLS.

The draining control signal CLS controls the draining switch DSS to activate the sampling units 260A, 260B, 260C and 260D to drain the current IR together from the current source 270. More specifically, when the draining control signal CLS is in a first state, e.g. the low state, the draining switch DSS is controlled to be open-circuited.

Subsequently, when the draining control signal CLS turns to a second state opposite to the first state, e.g. the high state, the draining switch DSS is controlled to be short-circuited to electrically couple the current source 270 and each of the transistors MS1, MS2, MS3 and MS4.

As illustrated in FIG. 2, the transistors MS1, MS2, MS3 and MS4 are PMOS transistors in some embodiments. The transistors MS1, MS2, MS3 and MS4 are turned on according to the sampled voltage VS1, VS2, VS3 and VS4 of the capacitors CS1, CS2, CS3 and CS4 respectively. The transistors MS1, MS2, MS3 and MS4 drain the current IS together from the current source 270.

In some embodiments, the transistors MS1, MS2, MS3 and MS4 drain the current IS through an output node O2 to generate the output voltage VOS thereat.

Figure 4:
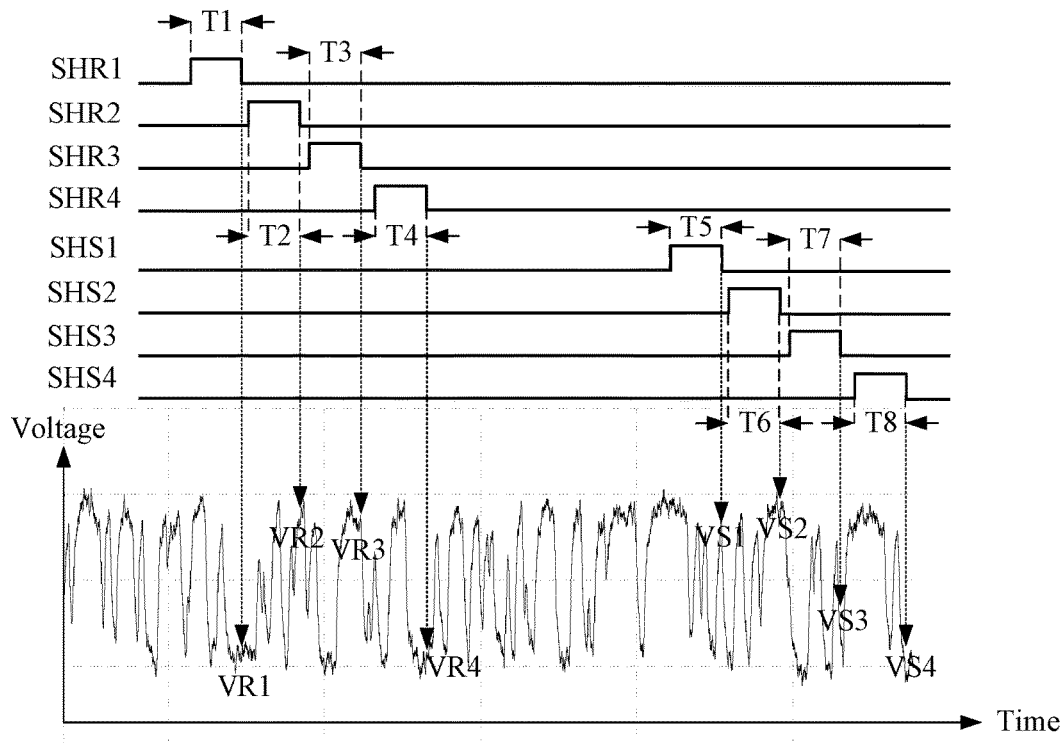
FIG. 4 is a waveform diagram of the sampling control signals and the voltage at the column line in FIG. 2, in accordance with various embodiments of the present disclosure.

FIG. 4 is a waveform diagram of the sampling control signals SHR1-SHR4 and SHS1-SHS4 and the voltage at the column line CL1 in FIG. 2, in accordance with various embodiments of the present disclosure.

The waveforms of the sampling control signals SHR1, SHR2, SHR3, SHR4, SHS1, SHS2, SHS3 and SHS4 in FIG. 4 are the same as the waveforms illustrated in FIG. 3. As a result, no further detail is described herein.

For illustration, for the waveforms of the voltage at the column line CL, the X-axis of the waveform represents time. The Y-axis of the waveform represents the level of the voltage at the column line CL1.

As illustratively shown in FIG. 4, the voltages at the column line CL1 at the time spots corresponding to end of the sampling time intervals T1, T2, T3 and T4 are indicated as voltages VR1, VR2, VR3 and VR3 that are sampled by the capacitors CR1, CR2, CR3 and CR4, respectively.

In some approaches, only a single sampling unit, e.g. the sampling unit 210A, is used to sample the voltage of the column line CL1 during the pixel reset sampling period 300. The noise generated due to the random telegraph signal (RTS) is sampled as well. The voltage sampled by the single sampling unit, e.g. the voltage VR1, is easily affected by the noise. When the noise is larger to increase more of the voltage VR1, the transistor MR1 becomes less conducted to drain less current IR from the current source 220.

Compared to the approaches discussed above, by employing multiple sampling units including the sampling units 210A, 210B, 210C and 210D, the sampled voltages VR1, VR2, VR3 and VR4 are affected by different amount of the noise, in which some are affected by more amount of the noise and some are affected by less amount of noise. As a result, the conduction of some of the transistors is affected by more amount of the noise and conduction of some of the transistors is affected by less amount of noise.

Further, the amount of current drained by some of the transistors is affected by more amount of the noise and the amount of current drained by some of the transistors is affected by less amount of the noise. The effect of the noise on the total amount current IR drained by the transistors MR1, MR2, MR3 and MR4 is therefore reduced due to the presence of the multiple sampling units including the sampling units 210A, 210B, 210C and 210D.

Similarly, the voltages at the column line CL1 at the time spots corresponding to end of the sampling time intervals T5, T6, T7 and T8 are indicated as voltages VS1, VS2, VS3 and VS3 sampled by the capacitors CS1, CS2, CS3 and CS4, respectively.

In some approaches, only a single sampling unit, e.g. the sampling unit 260A, is used to sample the voltage of the column line CL1 during the charger transfer sampling period 320. The noise generated due to the random telegraph signal (RTS) is sampled as well. The voltage sampled by the single sampling unit, e.g. the voltage VS1, is easily affected by the noise. When the noise is larger to increase more of the voltage VS1, the transistor MS1 becomes less conducted to drain less current IR from the current source 270.

Compared to the approaches discussed above, by employing multiple sampling units including the sampling units 260A, 260B, 260C and 260D, the sampled voltages VS1, VS2, VS3 and VS4 are affected by different amount of the noise, in which some are affected by more amount of the noise and some are affected by less amount of noise. As a result, the conduction of some of the transistors is affected by more amount of the noise and conduction of some of the transistors is affected by less amount of noise.

Further, the amount of current drained by some of the transistors is affected by more amount of the noise and amount of current drained by some of the transistors is affected by less amount of the noise. The effect of the noise on the total amount current IS drained by the transistors MS1, MS2, MS3 and MS4 is therefore reduced due to the presence of the multiple sampling units including the sampling units 260A, 260B, 260C and 260D.

In some embodiments, the dimensions of channels of the transistors MR1, MR2, MR3 and MR4 of each two of the sampling units 210A, 210B, 210C and 210D are either the same or are different from each other. Further, the dimensions of channels of the transistors MS1, MS2, MS3 and MS4 of each two of the sampling units 260A, 260B, 260C and 260D are either the same or are different from each other.

The number of the sampling circuits in the sampling device 120 illustrated in FIG. 2 are given for illustrative purposes. Various numbers of the sampling circuits are within the contemplated scope of the present disclosure. For example, in some embodiments, the sampling device 120 includes other sampling circuits configured to sample the voltage of the column CL2.

The number and the configuration of the sampling units 210A, 210B, 210C, 210D, 260A, 260B, 260C and 260D in FIG. 2 are given for illustrative purposes. Various numbers and the configurations of the sampling units are within the contemplated scope of the present disclosure.

Further, the order of the sampling performed by the sampling units 210A, 210B, 210C, 210D, 260A, 260B, 260C and 260D illustrated in FIG. 2 is given for illustrative purposes. Various orders of the sampling performed by the sampling units 210A, 210B, 210C, 210D, 260A, 260B, 260C and 260D are within the contemplated scope of the present disclosure.

Figure 5:
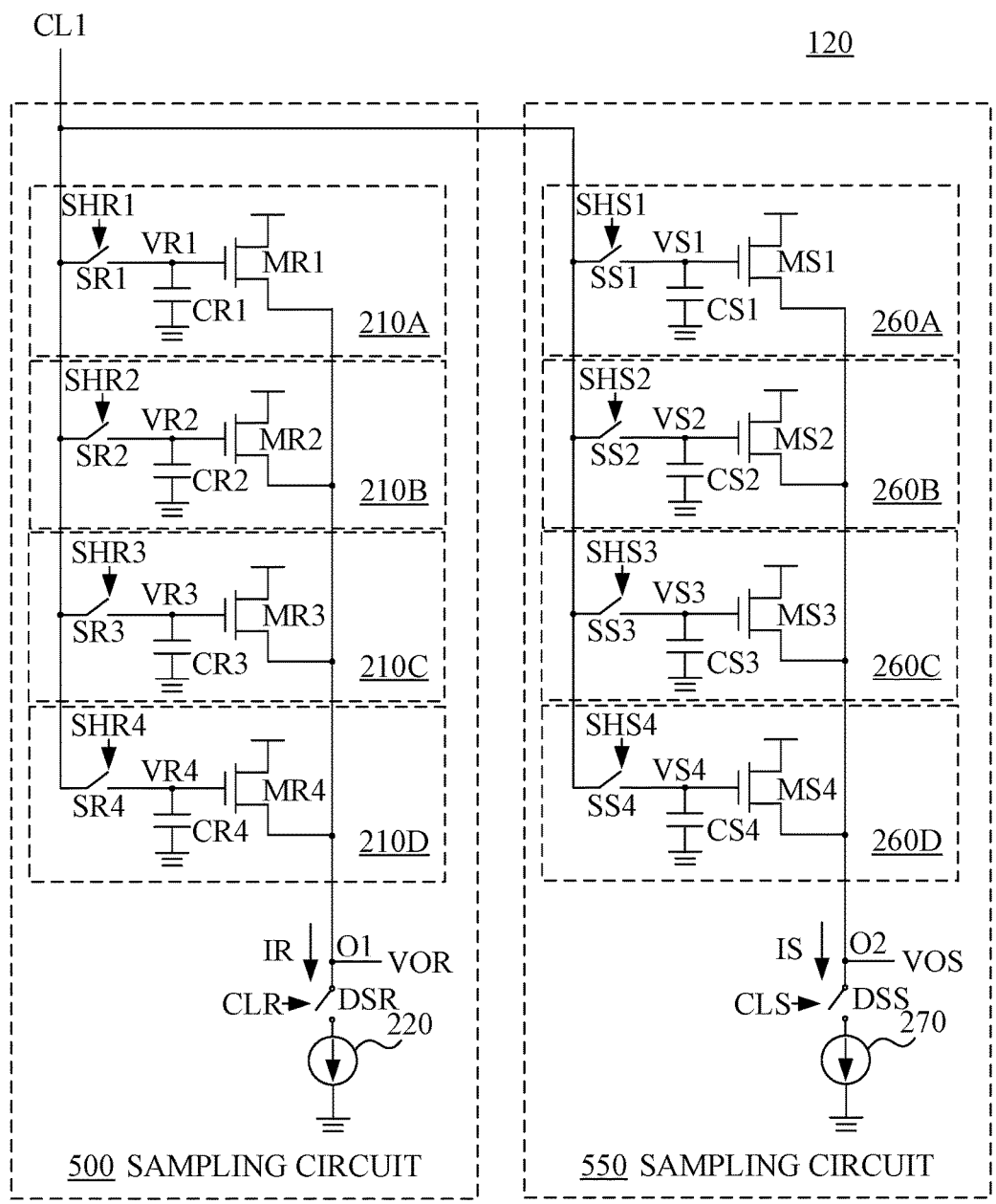
FIG. 5 is an exemplary diagram of the sampling device in FIG. 1, in accordance with various embodiments of the present disclosure.

FIG. 5 is an exemplary diagram of the sampling device 120 in FIG. 1, in accordance with various embodiments of the present disclosure.

As illustratively shown in FIG. 5, the sampling device 120 includes a sampling circuit 500 and a sampling circuit 550. Compared to FIG. 2, the configurations of the sampling circuit 500 and the sampling circuit 550 are similar to the configurations of the sampling circuit 200 and the sampling circuit 250 illustrated in FIG. 2, except that the transistors MR1, MR2, MR3, MR4, MS1, MS2, MS3 and MS4 are NMOS transistors.

Accordingly, the operation mechanism of the sampling circuit 500 and the sampling circuit 550 is similar to the sampling circuit 200 and the sampling circuit 250, in which the sampling circuit 500 is used to sample the voltage of the column line CL1 and generate the pixel reset voltage VOR, and the sampling circuit 550 is used to sample the voltage of the column line CL1 and generate the charge transfer voltage VOS. The detail of the operation is not further described herein.

Figure 6:
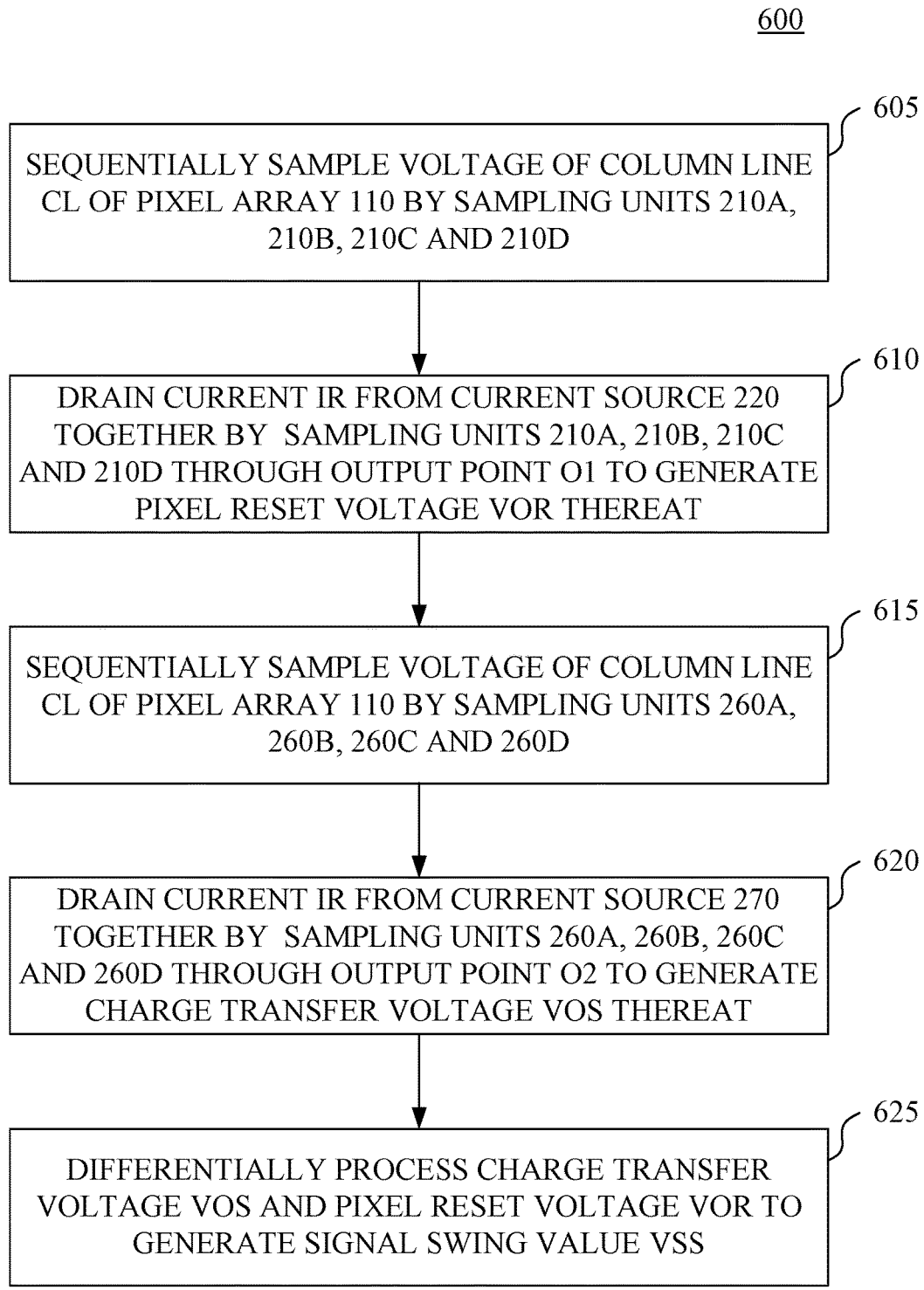
FIG. 6 is a flow chart of a sampling method illustrating the operation of the sampling device in FIG. 2, in accordance with various embodiments of the present disclosure.

FIG. 6 is a flow chart of a sampling method 600 illustrating the operation of the sampling device 120 in FIG. 2, in accordance with various embodiments of the present disclosure.

With reference to the method 600 illustrated in FIG. 6 and the sampling device 120 illustrated in FIG. 2, in operation 605, the voltage of the column line CL of the pixel array 110 is sequentially sampled by the sampling units 210A, 210B, 210C and 210D.

In operation 610, the current IR is drained from the current source 220 together by the sampling units 210A, 210B, 210C and 210D through the output node O1 to generate the pixel reset voltage VOR thereat. In some embodiments, the pixel reset voltage VOR is sampled and generated by the sampling units 210A, 210B, 210C and 210D during the pixel reset sampling period 300 illustrated in FIG. 3.

In operation 615, the voltage of the column line CL of the pixel array 110 is sequentially sampled by the sampling units 260A, 260B, 260C and 260D.

In operation 620, the current IS is drained from the current source 270 together by the sampling units 260A, 260B, 260C and 260D through the output node O2 to generate the charge transfer voltage VOS thereat. In some embodiments, the pixel reset voltage VOS is sampled and generated by the sampling units 260A, 260B, 260C and 260D during the pixel reset sampling period 320 illustrated in FIG. 3.

In operation 625, the charge transfer voltage VOS and the pixel reset voltage VOR are differentially processed to generate the signal swing value VSS.

The number and the order of the operations illustrated in FIG. 6 are given for illustrative purposes. Various numbers and the orders of the operations are within the contemplated scope of the present disclosure.

In some embodiments, a device is disclosed that includes a current source and a plurality of sampling units. Each of the sampling units includes a transistor and a capacitor electrically coupled to a gate of the transistor. The sampling units are sequentially activated such that the capacitor samples a voltage of a column line of a pixel array and are activated together such that the transistor is turned on according to the sampled voltage of the capacitor to drain a current from the current source through an output node to generate an output voltage thereat.

Also disclosed is a device that includes a first sampling circuit and a second sampling circuit. Each of the first and second sampling circuits includes a current source and a plurality of sampling units. The sampling units are configured to sequentially sample a voltage of a column line of a pixel array and configured to drain a current from the current source together through an output node to generate an output voltage thereat. The voltage sampled by the sampling units of the first sampling circuit is a pixel reset voltage and the voltage sampled by the sampling units of the second sampling circuit is a charge transfer voltage.

Also disclosed is a method that includes the steps outlined below. A voltage of a column line of a pixel array is sequentially sampled by a plurality of sampling units. A current is drained from a current source together by the plurality of sampling units through an output node to generate an output voltage thereat.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A device, comprising:
    a current source;

a plurality of sampling units each comprising a transistor and a capacitor electrically coupled to a gate of the transistor; and a draining switch configured to electrically couple the transistor of each of the sampling units and an output node according to a draining control signal to activate the transistors to drain a current from the current source, wherein the sampling units are sequentially activated such that the capacitor samples a voltage of a column line of a pixel array and are activated together such that the transistor is turned on according to the sampled voltage of the capacitor to drain the current from the current source through the output node to generate an output voltage thereat.

2. The device of claim 1, wherein each of the sampling units further comprises a sampling switch configured to electrically couple the capacitor and the column line according to a sampling control signal to activate the capacitor to sample the voltage.

3. The device of claim 1, wherein dimensions of channels of the transistors of groupings of two of the sampling units are either the same or are different from each other.

4. The device of claim 1, wherein sampling time intervals of the capacitors of groupings of two of the sampling units are non-overlapped.

5. The device of claim 1, wherein the transistor is an NMOS transistor or a PMOS transistor.

6. A device, comprising:
a first sampling circuit and a second sampling circuit each comprising:
  a current source; and
  a plurality of sampling units configured to sequentially sample a voltage of a column line of a pixel array and configured to drain a current from the current source together through an output node to generate an output voltage thereat,
wherein the voltage sampled by the sampling units of the first sampling circuit is a pixel reset voltage and the voltage sampled by the sampling units of the second sampling circuit is a charge transfer voltage,
wherein each of the sampling units comprises a transistor and a capacitor electrically coupled to a gate of the transistor, wherein the sampling units are sequentially activated such that the capacitors sample the voltage of the column line and are activated together such that the transistors are turned on according to the sampled voltage of the capacitors to drain the current from the current source through the output node to generate the output voltage thereat,
wherein each of the first sampling circuit and the second sampling circuit further comprises a draining switch configured to electrically couple the transistor of each of the sampling units and the output node according to a draining control signal to activate the transistors to drain the current.

7. The device of claim 6, further comprising:
a gain amplifier configured to amplify the output voltages generated by the first and the second sampling circuits; and an analog-to-digital converter configured to convert the amplified output voltages from an analog form to a digital form.

8. The device of claim 7, wherein each of the gain amplifier and the analog-to-digital converter is a differential pair circuit that sequentially amplifies and converts a differential value of the output voltages generated by the first and the second sampling circuits to generate a signal swing value.

9. The device of claim 6, wherein each of the sampling units further comprises a sampling switch configured to electrically couple the capacitor and the column line according to a sampling control signal to activate the capacitor to sample the voltage.

10. The device of claim 6, wherein dimensions of channels of the transistors of groupings of two of the sampling units are either the same or are different from each other.

11. The device of claim 6, wherein sampling time intervals of the capacitors of groupings of two of the sampling units are non-overlapped.

12. The device of claim 6, wherein the transistor is an NMOS transistor or a PMOS transistor.

13. A method, comprising:
sequentially sampling a voltage of a column line of a pixel array by a plurality of sampling units;
turning on, according to a draining control signal, a draining switch to electrically couple a transistor of each of the sampling units and an output node to activate the transistors;
activating the sampling units together such that the transistor in each of the sampling units is turned on according to a sampled voltage of a capacitor in each of the sampling units to drain a current from a current source through the output node to generate an output voltage thereat; and
draining the current from the current source together by the plurality of sampling units through the output node to generate the output voltage thereat.

14. The method of claim 13, further comprising;
sequentially sampling a pixel reset voltage of the column line of the pixel array by the sampling units of a first sampling circuit; and
sequentially sampling a charge transfer voltage of the column line of the pixel array by the sampling units of a second sampling circuit.

15. The method of claim 14, further comprising:
amplifying the output voltages generated by the first and the second sampling circuits; and
converting the amplified output voltages from an analog form to a digital form.

16. The method of claim 15, wherein a differential value of the output voltages are amplified and converted to generate a signal swing value.

17. The method of claim 14, further comprising:
sequentially activating the sampling units such that the capacitor in each of the sampling units samples the voltage of the column line.

* * * * *